United States Patent [19]
Plante

[11] 3,815,546

[45] June 11, 1974

[54] LOBSTER PLANT

[76] Inventor: Emile A. P. Plante, Badgers Inland, Kittery, Maine 03904

[22] Filed: Oct. 10, 1972

[21] Appl. No.: 296,041

[52] U.S. Cl. .................................................. 119/2
[51] Int. Cl. .......................................... A01k 61/00
[58] Field of Search ................................... 119/2–5

[56] References Cited
UNITED STATES PATENTS

| | | | |
|---|---|---|---|
| 517,652 | 4/1894 | Mann | 119/4 |
| 2,302,336 | 11/1942 | MacDonald | 119/2 |
| 2,858,799 | 11/1958 | Krauss et al. | 119/5 |
| 3,192,899 | 7/1965 | Lucey et al. | 119/2 |

Primary Examiner—Hugh R. Chamblee
Attorney, Agent, or Firm—John C. MacNab

[57] ABSTRACT

A lobster growing plant is the subject matter of this invention and each plant includes two separate vertical transparent cylindrical tanks for the growing of lobsters in two stages. The first tank is somewhat similar to the second tank except for size and differences in construction because of the larger size tank. Baby lobsters of about ⅛ inch size are placed, one to a compartment, in the small tank. In about four months these baby lobsters have grown to between 1½ to 2 inches in size. Then they are transferred to larger compartments in the larger tank, one to each compartment. In the larger compartments of the second tank these lobsters grow to 1½ to 2 pounds. Each tank has sea water and air circulating from the bottom to top and feed means are provided for each compartment in both tanks. The water in the tanks is temperature controlled for proper health and growth of the lobsters.

11 Claims, 6 Drawing Figures

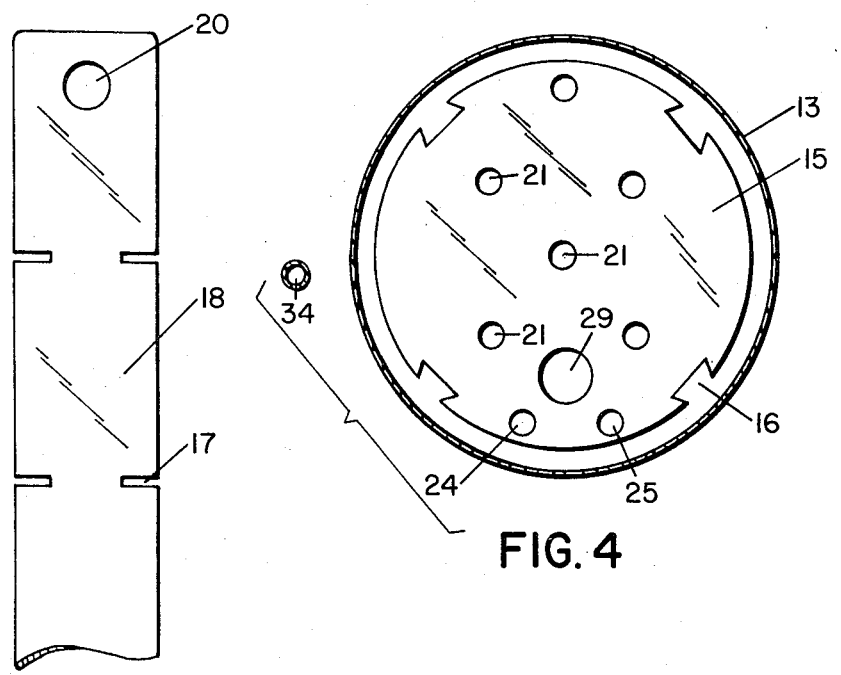
FIG. 4
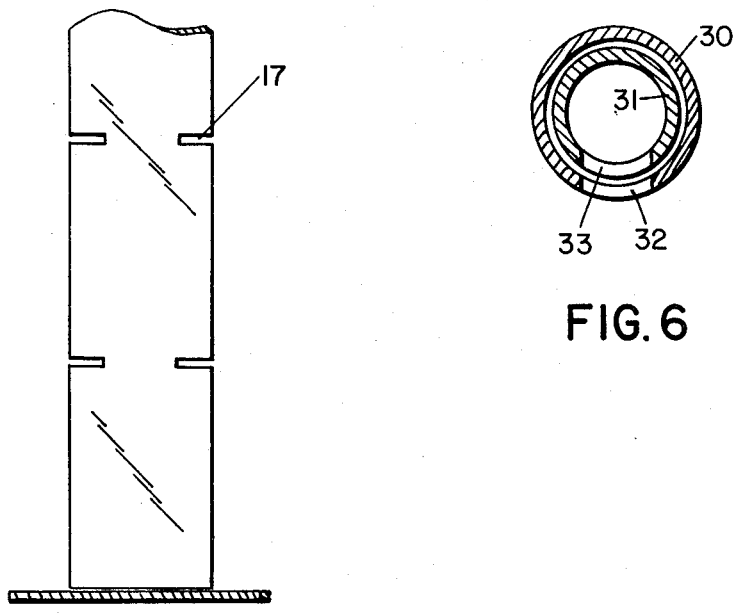
FIG. 6
FIG. 3

LOBSTER PLANT

My invention relates to apparatus for raising of lobsters in two stages from very small baby size about ⅛ of an inch in size and from 3 to 4 weeks old at the beginning of the first stage. In about 4 months the baby lobsters have grown to such size that they are then placed in the second stage where they grow in about two years to a marketable size of from 1½ to 2 pounds in weight. As is well known lobsters are very cannibalistic and territorial in nature and unless the individual lobster is provided with its own territorial space in a chamber apart from other lobsters of the same or different size during their growth, they will attack and eat each other. Because of this carnivorous nature, lobsters must be raised separately in partioned chambers or compartments.

Normally lobsters occur in the wild natural state in salt sea water where there are rocks, kelp, and small fish or other crustacaens and are caught by lobster fishermen in wooden slated lobster traps. Because of the inceasing number of traps and the present public demand for lobsters, the lobsters are becoming more and more difficult to catch and in their native states, they are gradually becoming extinct. The lobsters in the market are increasing rapidly in price because their numbers are decreasing while people in restraunts are demanding more and more as they are very delectable food and in constantly greater demand all over the country.

By raising lobsters individually each one is in excellent condition having all their claws and other elements intact.

Because the growth of lobsters is critically affected by the temperature of the water environment it is another object of this invention to maintain a constant temperature of the sea water during the entire growth cycle. This temperature should be maintained at between 70° and 72° Fahrenheit.

Other objects and advantages of this invention will become apparent from the following description taken in connection with the accompanying drawings wherein are set forth by means of illustration and example certain embodiments of this invention.

FIG. 3 shows a fragmented view of the spacing and holding strips for the rearing shelves.

FIG. 4 is a sectional view taken on line 4—4 of FIG. 2 showing a top view of one of the rearing shelves, the strips and the tank.

FIG. 6 is a sectional view on line 6—6 of FIG. 5 showing the valve arrangement of the feeding tubes.

Figure 1:
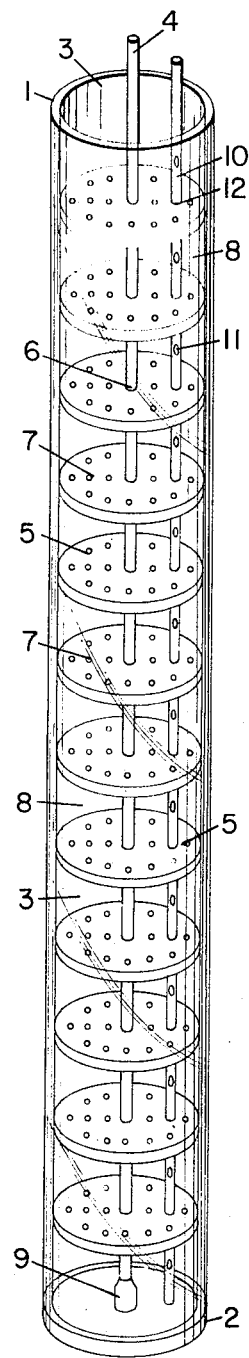
FIG. 1 is a perspective view of the first stage of the baby lobster raising tank.

The first stage for rearing the baby lobsters is shown in FIG. 1 and includes a clear, transparent, rigid plastic tube 1 about 2 inches in diameter and sealed at its bottom end by a clear imperforate plastic disc 2 to form a tank 3. This tank is about 30 inches long, more or less and rests upon its bottom end disc 2. The top 3 of this tank is open to the atmosphere. Tube 1 contains another plastic tube 4 of approximately 3/16 inch in diameter and on this tube 4 is a number of discs or shelves 5 of relatively rigid plastic material fixed at 6 to the tube 4. These discs or shelves 5 are spaced about 1 and ¼ inches apart on the tube 4 and the spaces between such shelves together with the inner wall of tube 1 form rearing chambers 8 for the rearing individual baby lobsters, one in each chamber. The shelves 5 are in sliding engagement with the inner wall of tube 1 and each shelf has a large number of very small perforations 7 there through to allow circulation of salt sea water and air from one chamber 8 to the next upper chamber 8 and overflowing over the top end of tube 1. The plastic tube 4 has an air stone 9 on its lower end through which the salt sea water and entrained air passes into the bottom area of tube 1 above the end disc 2. A feed rod 10 of stainless steel and having a small diameter is slidably mounted through small aligned openings 12 in the shelves 5. This feed rod 10 has very small notches or roughness 11 spaced along its length to retain small increments of food thereon as described below. The rod 10 can be raised out of the tank 3, charged with food and lowered again into the tank 3 through the small openings 12 in the shelves 5. To facilitate the entry of this rod 10 through the openings 12 in the shelves the bottom end of the rod is beveled slightly.

In operation of the first stage the tank 3 for rearing the baby lobsters is charged or filled in the following manner. The shelf assembly including shelves 5, tube 4 and rod 10 is raised out of the tank 3 by means of tube 4 to which the shelves 5 are fixed. The tank 3 is filled with sea water. The shelf assembly is then lowered into the tank 3 with one baby lobster on each shelf 5. As the shelf assembly is lowered into the tank 3, an additional baby lobster is placed on each shelf and thusly each baby lobster has its own living compartment or chamber 8. Fresh sea water is admitted through tube 4 and in operation air in the sea water gradually collects in a small area at the top of each shelf but allowing the water to circulate from the bottom of the tank 3 to overflow over the top of the tank 3. The sea water is continuously fed into the bottom of the tank 3 through the tube 4 and its overflow at the top of tank 3 carries any small particles of debris or waste out of the tank 3 to keep the contents in healthy condition. At intervals of from 1 to 2 days the rod 10 is raised out of the tank 3 and smeared with food in the form of a paste and the rod replaced into the tank 3.

In about 4 months the tiny baby lobsters have grown to between 1½ to 2 inches in size. The tank 3 is then discharged and each lobster is placed into a compartment in a larger cylindrical tank, described below.

Figure 2:
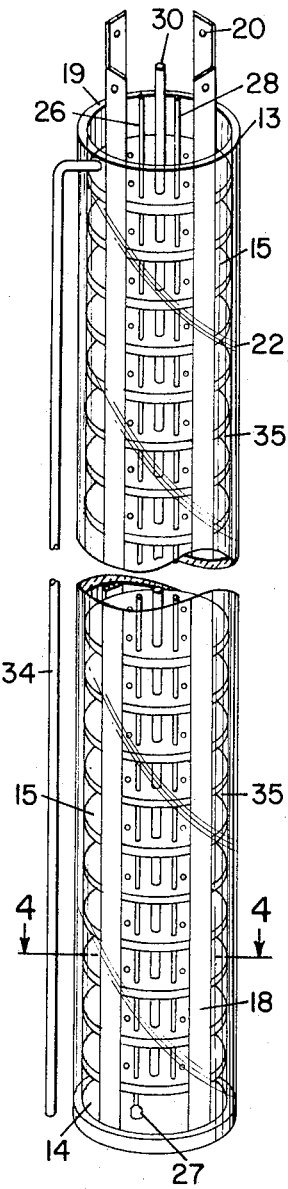
FIG. 2 shows a perspective view of the second stage or the normal lobster raising tank.

The second stage tank 22 FIG. 2, is somewhat similar to the first tank 3 FIG. 1 but it is much larger and requires a different construction because of its size and the additional weight of water and lobsters therein. This tank 22 includes a large cylinder 13 of clear transparent plastic material which may be between 3 and 10 feet in length and have a diameter of about 11 inches. These diameters are by way of example only and are not to be considered in a limiting sense. This cylinder 13 has a bottom end disc 14 of plastic material welded thereto. The lobster rearing shelves 15, one of which is shown to a larger scale in FIG. 4 is made of clear plastic material. Each shelf 15 has at least four wedge shaped cutaway notches 16, shown in FIG. 4 which engage slots 17 in spacing strips 18. An enlarged detail of one spacing strip is shown in FIG. 3. The shelves 15 are tightly mounted on the spacing strips 18 by means of slots 17 and cutaway notches 16 and the shelves are spaced about 3 ½ inches apart. The strips 18 and shelves 15 attached thereto form an assembly which is slipable in to and out of tank 22 from the top open end and has about ¼ inch clearance between circumferential edges of the shelves 15 and the inner side walls of the tank 22. The strips 18 extend beyond the top 19 of the tank 22 and have lifting openings 20 therethrough FIG. 3, whereby a rod or tool not shown, may be inserted to raise and lower the shelf 15 assembly into and out of the tank 22.

Figure 5:
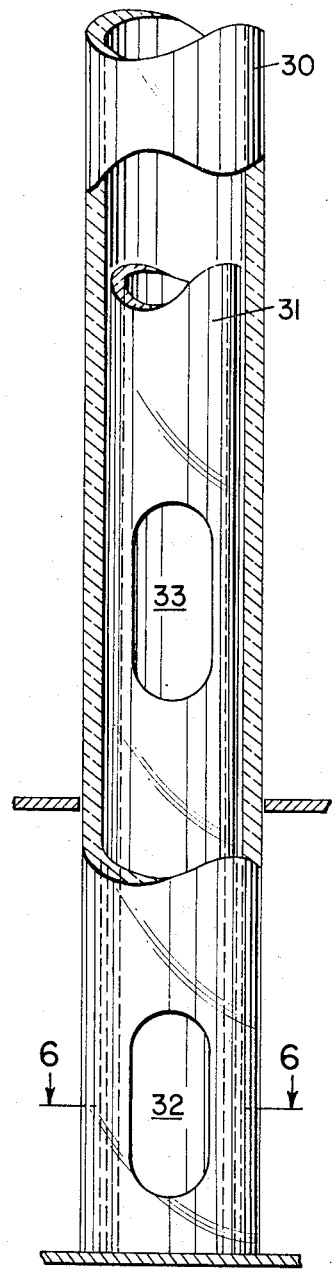
FIG. 5 shows a vertical view of a short portion of the feed tubes with a portion of the outer sleeve broken away.

Each shelf 15 has openings therethrough as shown in FIG. 4, ⅜ inch holes 21 through which sea water and air can circulate from the bottom to the top of cylinder 13 which with its closed bottom 14 forms a rearing tank 22. The discs 15 also have aligned air line holes 24 and water line holes 25 each about ¼ inch in diameter. The air line holes 24 receive an air line pipe 26 having an air stone 27 on its lower end and its upper end extending above the tank 22 where it is connected to an air pump not shown. The water line holes 25 in the shelves 15 are aligned and receive a water pipe 28 open at its lower end to discharge salt sea water in to the lower end of tank 22. The top end of the water pipe 28 extends above the tank 22 and is connected to a pump, not shown. There is also food pipe opening 29 of about 1 ½ inches in diameter and offset from the centers of the shelves 15. Through these openings 29 a food tube 30, FIGS. 5 and 6 having an inner tube 31 rotatably mounted inside food tube 30. These tubes have matching elongated openings or slots 32 and 33 therethrough as shown in FIGS. 5 and 6. These inner and outer tubes 30 and 31 extend from above the top 19 of the tank 22 to the bottom 14 thereof. In practice the tubes 30 and 31 are withdrawn from the tank 22, the one tube 30 is turned relative to tube 31 so that the openings 32 and 33 do not match and the inner tube 31 is filled with lobster food after which the tubes 30 and 31 are returned to the tank 22.

The tank 22 has an overflow tube 34 of plastic material attached adjacent to the top of cylinder 22 and overflowing to the atmosphere.

It is understood that the spaces between each pair of adjacent shelves 15 form rearing chambers 35 and each chamber receives one lobster.

In operation of the second stage for the rearing of lobsters the shelf assembly including shelves 15, strips 18, the air pipe 26, the water pipe 28 and food tubes 30 and 31 are raised as a unit from the tank 22. As the assembly is lowered back into the tank 22 a baby lobster, 1 ½ to 2 inches in size is taken from stage one and placed in the space between the two lower shelves 15 and this portion lowered into the tank 22. The space between each two shelves 15 and the wall of the tank is of sufficient size to permit a baby lobster to grow to marketable size, 1 ½ to 2 pounds in is own chamber separated from all other lobsters. At the appropriate time, the sea water is pumped into the tank and the air is pumped into the tank. The food tubes having been charged with food prior to insertion in the tank are rotated relatively to allow their openings to match and permit food to be extruded for the lobsters. This feeding process requires only a few minutes every two or three days.

The two tanks FIG. 1 and FIG. 2 constitute a combination wherein baby lobsters about ⅛ inch in size at 3 to 4 weeks old are raised in a period of about 4 months to 1 ½ to 2 inches in size, each lobster in a separate compartment. Transfer is then made of these partly grown lobsters to the tank shown in FIG. 2. In the tank of FIG. 2 each lobster also has its separate compartment and lives in its compartment until it is 1 ½ to 2 pounds in weight and ready for market. The temperature of the water in both tanks is maintained at between 70° and 72° Fahreheit.

In both tanks the food elements are vertical and spaced a sufficient distance from the walls of the tanks to allow the lobsters to eat when in a vertical or tilted position because they cannot eat off the shelves due to the position of their mouths.

I claim:

1. An apparatus for the raising of lobsters, comprising a vertical cylindrical tank of transparent plastic material; perforated shelves; means mounting and retaining said shelves in spaced relation in said tank, said means permitting said shelves to be raised out of said tank and lowered into the tank as a unit; lobster rearing compartments formed by the shelves and the tank wall, each compartment to contain one lobster; means providing the tank and compartments therein with salt sea water and air and means providing each compartment with food.

2. The apparatus of claim 1, wherein said means mounting said shelves comprises a hollow tube, means attaching the tube to and through the centers of each shelf; the tube extending from above the top of the tank to a space in the bottom of the tank whereby air and sea water can be admitted to flow up through the shelves to be discharged at the top of the tank.

3. The apparatus of claim 2, wherein the means providing each compartment with food comprises a stainless steel rod having small notches in its surface; means permitting the rod to pass through the shelves from top to bottom of the tank, said notches holding small food particles smeared on the rod before it is inserted in the tank, there being a group of notches exposed in each chamber in the tank.

4. The apparatus of claim 3 in which the means mounting and retaining said shelves comprises the means permitting said shelves to be raised.

5. The apparatus recited in claim 4, wherein the means mounting and retaining the shelves comprises four vertical bars each having spaced slits therein; the perforated shelves each have wedge shaped openings in their circumference to receive the slits in the vertical bars; openings adjacent the top ends of the bars to receive a tool to raise and lower the shelf assembly out of and into the tank; the means providing the tank with air, salt sea water and food constituting three separate and distinct means.

6. The apparatus of claim 5 wherein the means providing air is a separate rigid plastic tube extending from above the tank through openings in the shelves to adjacent the bottom of the tank; whereby when the tank has been filled with sea water, a pump continuously feeds air into the bottom of the tank and such air perculating through the shelves passes out at the top of the tank.

7. The apparatus of claim 6, wherein the means providing water comprises a separate rigid plastic tube extending from above the tank to adjacent the bottom of the tank; an air stone fixed to the lower end of the water tube to allow sea water to pass into the tank without surging action; means providing openings through the shelves to permit the tube to extend from the top to the bottom of the tank; an overflow pipe connected adjacent the top of the tank to discharge overflow water together with floating waste matter from the tank, the water being continuously pumped by means to the bottom of the tank.

8. The apparatus recited in claim 7 wherein the means providing food comprises two rigid tubes, said tubes being of slightly different diameter, the smaller diameter tube being rotatably fitted within the larger diameter tube and extending a distance above the larger tube to provide means to rotate one tube relative to the other; the shelves providing openings, eccentrically located, through the shelves to receive the nested tubes which extend from above the tank to adjacent the lower end thereof, means closing the lower end of the small diameter tube, discharge openings in said tubes which register with each other in one position of rotation and close in another position of rotation, the number and the spacing of the openings in the tube be such as to allow passage of food into each chamber separately.

9. Apparatus for rearing of lobsters comprising a vertical cylindrical tank, a hollow tube for water and air; means comprising perforated disc shaped shelves; means attaching said shelves in spaced relation in said hollow tube; the circumferences of said shelves slidably engaging the inner wall of said cylindrical tank, the water tube having an air stone on its lower end adjacent the bottom of said tank to allow both water and air to pass down the tube and out into the lower end of the tank; feed means comprising a rod having very small notches to receive food on its surface; aligned means through said shelves to allow the rod to pass through each of said shelves from top to bottom of said tank; the spaces between the shelves and the tank wall forming individual lobster rearing compartments and the notches in the rod being exposed in each compartment.

10. A raising device comprising an elongated clear vertical plastic cylinder in the range of three to ten feet long; a closure bottom sealed to its lower end to provide a tank; the top end being open to the atmosphere; a rigid assembly, means slidably mounting said assembly in said cylinder, said assembly including perforated plastic disc shelves, vertical bar means and spaced slots in said bar means, circumferential wedge shaped slots spaced about the circumference of each disc shelf to be received by the slots in said bars to provide said rigid assembly; means including openings in the top end of opposite bars to raise and lower the assembly into and out of said cylinder; air supply means extending through said shelves from above the top of the cylinder to adjacent the bottom thereof; water supply means extending through said shelves from above the top of the cylinder to adjacent the bottom thereof; removable food supply means including an inner tube and an outer tube extending in off center position through said shelves from above the top of the cylinder to a position adjacent the bottom thereof; said food tubes being rotatable relative to each other, said tubes having openings therethrough and in one relative rotated position said openings register to permit food to extrude through said openings; the spacing of the shelves and the inner wall of the cylinder forming chambers vertically spaced, one above the other in said cylinder and the openings in said food supply tubes being spaced to provide a regulatable opening in each of said chambers, and an overflow pipe adjacent the top of the cylinder to discharge water from the top of the tank.

11. A device for growing lobsters from one and one half to two inches in size to maturity, 1 ½ to 2 pounds, comprising individual vertically spaced cylindrical chambers; a single transparent vertical cylinder forming the outer wall of each chamber and perforate transparent discs forming the top and bottom wall of each chamber; means connecting said discs together to permit their removal and replacement in said cylinder as a unit; air supply means, salt sea water supply means and food supply means all passing through openings in said discs from the top to adjacent the bottom of the single cylinder where air and water is fed to the bottom of the cylinder which percolates through each chamber and overflows from the top of the cylinder; the food supply means having valve means to discharge food into each separate chamber when desired.

* * * * *